United States Patent
Liu et al.

(10) Patent No.: US 10,328,645 B2
(45) Date of Patent: Jun. 25, 2019

(54) REUSABLE LENS MOLDS AND METHODS OF USE THEREOF

(71) Applicant: Novartis AG, Basel (CH)

(72) Inventors: Alice Weimin Liu, Alpharetta, GA (US); Ying Pi, Suwanee, GA (US)

(73) Assignee: NOVARTIS AG, Basel (CH)

(*) Notice: Subject to any disclaimer, the term of this patent is extended or adjusted under 35 U.S.C. 154(b) by 311 days.

(21) Appl. No.: 15/347,081

(22) Filed: Nov. 9, 2016

(65) Prior Publication Data
US 2017/0173902 A1 Jun. 22, 2017

Related U.S. Application Data

(60) Provisional application No. 62/268,859, filed on Dec. 17, 2015.

(51) Int. Cl.
| | |
|---|---|
| *B29D 11/00* | (2006.01) |
| *B29C 39/26* | (2006.01) |
| *B29L 11/00* | (2006.01) |

(52) U.S. Cl.
CPC ........ *B29D 11/00519* (2013.01); *B29C 39/26* (2013.01); *B29D 11/0049* (2013.01); *B29D 11/00057* (2013.01); *B29D 11/00134* (2013.01); *B29D 11/00192* (2013.01); *B29K 2909/08* (2013.01); *B29L 2011/0041* (2013.01)

(58) Field of Classification Search
CPC ........ B29D 11/00519; B29D 11/00057; B29D 11/00134; B29D 11/00192; B29D 11/0049; B29C 39/26
See application file for complete search history.

(56) References Cited

U.S. PATENT DOCUMENTS

| | | |
|---|---|---|
| 5,091,244 A | 2/1992 | Biornard |
| 5,105,310 A | 4/1992 | Dickey |
| 5,407,733 A | 4/1995 | Bjornard et al. |
| 5,508,317 A | 4/1996 | Mueller |
| 5,583,163 A | 12/1996 | Mueller |
| 5,760,100 A | 6/1998 | Nicolson et al. |
| 5,789,464 A | 8/1998 | Mueller et al. |
| 5,849,810 A | 12/1998 | Mueller et al. |
| 6,565,776 B1 | 5/2003 | Li et al. |
| 6,627,124 B1 | 9/2003 | Herbrechtsmeier et al. |

(Continued)

FOREIGN PATENT DOCUMENTS

EP 0078604 A2 5/1983

*Primary Examiner* — Mathieu D Vargot
(74) *Attorney, Agent, or Firm* — Sheng-Hsin Hu

(57) ABSTRACT

The present invention general related to a method and a reusable mold for making a contact lens, comprising a first mold half having a first mold surface in contact with a hydrogel contact lens forming composition and a second mold half having a second mold surface in contact with the lens forming composition, wherein the first mold half and the second mold half are configured to receive each other such that a cavity is formed between the first mold surface and the second mold surface, wherein the cavity defines the shape of a contact lens to be molded, wherein the lens forming composition is polymerizable and/or crosslinkable by an actinic radiation, wherein at least one of the mold halves having an absorbing antireflective coating, wherein the reusable mold is a non-plastic mold.

12 Claims, 2 Drawing Sheets

(56) References Cited

U.S. PATENT DOCUMENTS

| | | | |
|---|---|---|---|
| 6,800,225 | B1 | 10/2004 | Hagmann et al. |
| 7,384,590 | B2 | 6/2008 | Kelly et al. |
| 7,387,759 | B2 | 6/2008 | Kelly et al. |
| 7,605,190 | B2 | 10/2009 | Moszner et al. |
| 8,030,369 | B2 | 10/2011 | Winterton |
| 8,163,206 | B2 | 4/2012 | Chang et al. |
| 8,480,227 | B2 | 7/2013 | Qiu et al. |
| 9,156,215 | B2 | 10/2015 | Samuel et al. |
| 9,315,669 | B2 | 4/2016 | Holland et al. |
| 2004/0178541 | A1 | 9/2004 | Kelly et al. |
| 2004/0222539 | A1 | 11/2004 | Hagmann et al. |
| 2006/0065989 | A1 | 3/2006 | Druffel et al. |
| 2006/0251696 | A1 | 11/2006 | Winterton et al. |
| 2007/0023942 | A1* | 2/2007 | Andino ............... B29C 35/0805 264/1.32 |
| 2011/0057337 | A1 | 3/2011 | Hagman et al. |
| 2011/0147958 | A1 | 6/2011 | Campanelli et al. |
| 2014/0144426 | A1* | 5/2014 | Cespedes Montoya ..................... C23C 28/321 126/694 |
| 2015/0174663 | A1 | 6/2015 | Liu et al. |

* cited by examiner

REUSABLE LENS MOLDS AND METHODS OF USE THEREOF

This application claims the benefit under 35 U.S.C. § 119 (e) of U.S. provisional Application No. 62/268,859 filed Dec. 17, 2015, the content of which are incorporated by reference in its entirety.

BACKGROUND

A great effort has been made to develop technologies for cast molding of hydrogel contact lenses with high precision, fidelity and reproducibility and at low cost. One of such manufacturing technologies is the so-called Lightstream Technology™ (Alcon) involving reusable molds and curing a lens-forming composition under a spatial limitation of actinic radiation (U.S. Pat. Nos. 5,508,317, 5,583,163, 5,789,464, 5,849,810, and 8,163,206), which are incorporated by reference in their entireties. The Lightstream Technology™ involves (1) a lens-forming composition, (2) reusable molds produced in high precision, and (3) curing under a spatial limitation of actinic radiation (e.g., UV/Visible light). Lenses produced according to the Lightstream Technology™ can have high consistency and high fidelity to the original lens design, because of use of reusable, high precision molds. In addition, contact lenses with high quality can be produced at relatively lower cost due to the short curing time and a high production yield.

Modern high-volume mass production process for medical devices like contact lenses utilizes re-usable molds in each production cycles. The conventional re-usable contact lens mold consists of a quartz convex base curve and a glass concave front curve. The base curve mold is composed of individually ground and polished quartz, while the front curve mold is composed of high precision press mold and polished glass. However, hydrogel contact lens production in curing under a spatial limitation of actinic radiation with Lightstream Technology™ may produce flash along lens edge due to lens forming material left in gap between base curve mold and front curve during curing under a spatial limitation of actinic radiation. Furthermore, when manufacturing UV absorbing contact lenses in the Lightstream technology, the lens edge quality issues (flash) become more severe than when manufacturing non-UV absorbing contact lenses.

Therefore, there is a need for new reusable molds for front curve mold that can produce lens with clean cut lens edge (no flash).

SUMMARY OF THE INVENTION

The invention, in one respect, relates to a reusable mold for making a contact lens, comprising a first mold half having a first mold surface in contact with a hydrogel contact containing lens forming composition and a second mold half having a second mold surface in contact with the lens forming composition, wherein the first mold half and the second mold half are configured to receive each other such that a cavity is formed between the first mold surface and the second mold surface, wherein the cavity defines the shape of a contact lens to be molded, wherein the lens forming composition is polymerizable and/or crosslinkable by an actinic radiation, wherein at least one of the mold halves having an absorbing antireflective coating, wherein the reusable mold is a non-plastic mold.

The invention, in another respect, relates to a method for producing a contact lens, comprising: the steps of:

(1) providing a contact lens mold, wherein the mold comprising a first mold half having a first mold and a second mold half having a second mold surface, wherein the first mold half and the second mold half are configured to receive each other such that a cavity is formed between the first mold surface and the second mold surface, wherein the cavity defines the shape of a contact lens to be molded, wherein at least one of the mold halves having an absorbing antireflective coating, wherein the mold is a non-plastic mold (2) introducing a lens-forming composition into the mold cavity formed by the first and second molding surfaces, material, wherein the lens-forming material is crosslinkable and/or polymerizable by actinic radiation; (3) crosslinking/polymerizing the lens-forming material in the mold to form a lens having a polymer matrix; (4) opening the mold and removing the formed contact lens from the mold, wherein the formed contact lens has a clean lens edge without flash.

DETAILED DESCRIPTION OF EMBODIMENTS OF THE INVENTION

Figure 1:
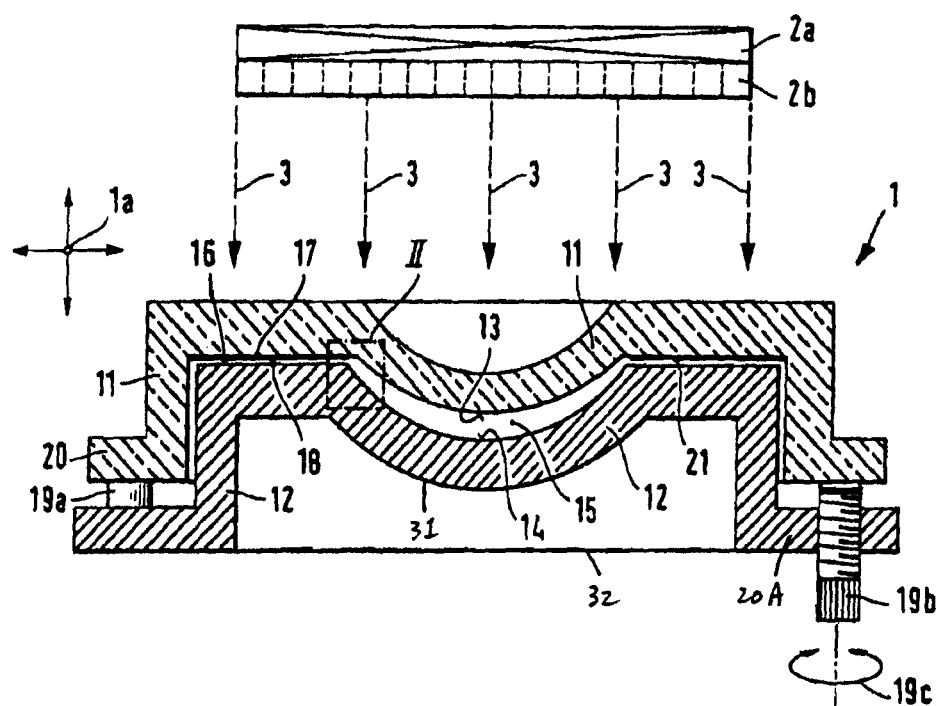
FIG. 1 shows a section through an exemplary embodiment of a casting mold according to the invention in the closed position.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art. As employed throughout the disclosure, the following terms, unless otherwise indicated, shall be understood to have the following meanings.

"Oxide glass" refers to glass comprises oxide selected from the group consisting of Aluminum oxide, Antimony trioxide, Arsenic trioxide, Barium oxide, Bismuth(III) oxide, Boron trioxide, Calcium oxide, Cerium(III) oxide, Chromium(III) oxide, Gadolinium oxide, Germanium oxide, Iron (III) oxide, Lanthanum oxide, Lead(II) oxide, Lithium oxide, Magnesium oxide, Niobium pentoxide, Phosphorus pentoxide, Potassium oxide, Silicon dioxide, Sodium oxide, Strontium oxide, Sulfur dioxide, Tin dioxide, Titanium dioxide, Zinc oxide, Zirconium dioxide, Tellurium oxide, yttrium oxide and combination therefore.

"Quartz" refers to the second most abundant mineral in the Earth's continental crust, after feldspar. It is made up of a continuous framework of $SiO_4$ silicon-oxygen tetrahedra, with each oxygen being shared between two tetrahedra, giving an overall formula $SiO_2$.

"Plastic" refers to a material consisting of any of a wide range of synthetic or semi-synthetic organics that are malleable and can be molded into solid objects of diverse shapes. Plastics are typically organic polymers of high molecular mass, but they often contain other substances. They are usually synthetic, most commonly derived from petrochemicals, but many are partially natural "Antireflective Coating" refers to a type of optical coating applied to the surface of an optical device to reduce reflection. Anti-reflective coating (AR coating) is made of multilayers of index matching materials that are layered on the surface of the optical device in this case contact lens mold.

Each layer is chemically engineered to have the desired index of refraction and resulting multilayer construction had low reflectance.

"Absorbing antireflective Coating" refers to a type of anti-reflection coating which contains light absorption layers. Absorbing antireflective Coating is useful in situations where high transmission through a surface is unimportant or undesirable, but low reflectivity is required. Absorbing antireflective Coatings often make use of unusual optical properties exhibited in compound thin films produced by sputter deposition.

"Broadband anti-reflection coating" refers to a type of anti-reflection coating which covers a large wavelength range in the order of hundreds of nm e.g. the visible range (400-700 nm) with maximum reflectivities of less than 0.5%

"Narrowband anti-reflection coating" refers to a type of anti-reflection coating which only covers a small wavelength range typically under 100 nm.

"Angle of incidence" refers to a measure of deviation of something from "straight on" and is angle between the incident ray and the normal.

"Near normal incident" refers to an angle of incidence from 0° to 20° where the residual reflectance of anti-reflection coated surfaces essentially independent of angle of incidence.

"Sputter deposition" refers to a physical vapor deposition (PVD) method of thin film deposition by sputtering. This involves ejecting material from a "target" that is a source onto a "substrate" such as a silicon wafer. Resputtering is re-emission of the deposited material during the deposition process by ion or atom bombardment. Sputtered atoms ejected from the target have a wide energy distribution, typically up to tens of eV (100,000 K). The sputtered ions (typically only a small fraction of the ejected particles are ionized—on the order of 1%) can ballistically fly from the target in straight lines and impact energetically on the substrates or vacuum chamber (causing resputtering).

"Flash" refers to excess material attached to a molded lens edge which must usually be mechanically removed. This is typically caused by curing the material between the two surfaces of a mold. For example, flash forms from lens forming material left in gap between base curve mold and front curve during curing under a spatial limitation of actinic radiation. This is particular an issue for Lightstream molds as the base curve and front curve molds never touched to form the mechanical shut off. Lens edge is formed via optical instead of mechanical shut off.

"An optical quality surface" refers to a glass surface has a surface roughness less than 30 nm, preferably less than 20 nm, most preferably less than 10 nm.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

An "ophthalmic lens" refers to a contact lens and/or an intraocular lens. A "contact lens" refers to a structure that can be placed on or within a wearer's eye. A contact lens can correct, improve, or alter a user's eyesight, but that need not be the case. A "hydrogel contact lens" refers to a contact lens comprising a hydrogel material. A "hydrogel material" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

As used in this application, the term "hydrogel" or "hydrogel material" refers to a crosslinked polymeric material which is not water-soluble and can contains at least 10% by weight of water within its polymer matrix when fully hydrated.

A "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer" refers to a compound that has one sole ethylenically-unsaturated group.

The term "olefinically unsaturated group" or "ethylenically unsaturated group" is employed herein in a broad sense and is intended to encompass any groups containing at least one >C=C< group.

A "UV-absorbing vinylic monomer" refers to a compound comprising an ethylenically-unsaturated group and a UV-absorbing moiety which can absorb or screen out UV radiation in the range from 200 nm to 400 nm as understood by a person skilled in the art.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV radiation is obtained by using a mask or screen having a radiation (e.g., UV and/or visible light) permeable region, a radiation (e.g., UV and/or visible light) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation and/or visible radiation) having a cross-sectional profile defined by the projection contour of the mask or screen. The projected beam of radiation (e.g., UV radiation and/or visible radiation) limits radiation impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV and/or visible beam (i.e., a spatial limitation of radiation). The radiation used for the crosslinking is radiation energy, especially UV radiation (and/or visible radiation), gamma radiation, electron radiation or thermal radiation, the radiation energy preferably being in the form of a substantially parallel beam in order on the one hand to achieve good restriction and on the other hand efficient use of the energy.

A "lens-forming material" refers to a material which can be polymerized and/or crosslinked by actinic radiation to form a contact lens.

"Actinic radiation" refers to radiation of a suitable form of energy. Examples of actinic radiation includes without limitation light radiation (e.g., UV radiation), gamma radiation, electron radiation, X-ray irradiation, microwave irradiation, thermal radiation and the like.

"UVA" refers to radiation occurring at wavelengths between 316 and 380 nanometers; "UVB" refers to radiation occurring between 280 and 315 nanometers; "Violet" refers to radiation occurring at wavelengths between 381 and 440 nanometers.

"UVA transmittance" (or "UVA % T"), "UVB transmittance" or "UVB % T", and "average violet-transmittance" or "Violet % T" are calculated by the following formula:

$$UVA\ \%\ T = \frac{\text{Average \% Transmission between 316 nm and 380 nm}}{\text{Luminescence \% } T}$$

$$UVB\ \%\ T = \frac{\text{Average \% Transmission between 280 nm and 315 nm}}{\text{Luminescence \% } T}$$

Violet % $T$ = Average % Transmission between 381 nm and 440 nm in which Luminescence % T is defined according to ISO 18369-3 (section 4.6.1.2)

"UV-absorbing silicone hydrogel contact lenses" refers silicone hydrogel contact lenses which have an UVB transmittance of about 10% or less between 280 and 315 nanometers, an UVA transmittance of about 30% or less between 316 and 380 nanometers, optionally (but preferably) an average violet transmittance of about 70% or less between 381 nm and 440 nm. UV-absorbing silicone hydrogel contact lenses protect eyes to some extent from damages caused by UV radiation and potentially by high energy violet light (HEVL).

Further aspects and advantages of the process according to the invention and of the device according to the invention will be seen from the description that follows, in conjunction with the drawings.

The device shown in FIG. 1 is designed for the manufacture of contact lenses from a liquid starting material which may be polymerized or crosslinked by actinic radiation. It comprises a mold 1 and an energy source 2a, here a UV light source, as well as means 2b for directing the energy provided by the energy source 2a to the mold in the form of an essentially parallel beam. Of course, the energy source 2a and means 2b can also be combined to form a single unit.

The mold consists of two mold halves 11 and 12, each having a curved mold surface 13 and 14 which together define a mold cavity 15, which in turn determines the shape of the contact lens to be manufactured. The mold surface 13 of the upper mold half 11 in the drawing is convex and determines the rear and base surface of the contact lens with the connected edge area; this mold half is normally called the male mold half. Conversely, the mold surface 14 of the other mold half, which is correspondingly called the female mold half, is concave and determines the front face of the contact lens to be manufactured, likewise with the connected edge area.

The mold cavity 15 is not completely and tightly closed, but in the embodiment illustrated is open around its peripheral edge which defines the edge of the contact lens to be manufactured, and is linked to a relatively narrow annular gap 16. The annular gap 16 is limited or formed by a flat mold wall 17 and 18 on each of the father mold half 11 and the mother mold half 12. In order to prevent complete closure of the mold, spacers, for example in the form of several bolts 19a and 19b, are provided on the mother mold 12, and these interact with a collar or flange 20 of the father mold 11 and keep the two mold halves at such a distance apart that the said annular gap 16 results. As is indicated symbolically in FIG. 1 by the right-hand spacer bolt 19b with a thread, the spacers may also be of adjustable or spring-action formation. In this way, the two mold halves 11, 12 can be moved towards one another during the crosslinking process to balance out leakage, by adjusting the spacers (indicated symbolically by the arrow 19c showing the direction of rotation) or against a spring action. Of course, the mold can be opened and closed in the usual manner, for example by means of a closure unit which is indicated here only by the arrow symbol 1a. Adjustment of the gap between the two mold halves 11, 12 to balance out leakage, may also be effected e.g. using this external closure unit.

It is also conceivable that, instead of the continuous annular gap 16 and the spacers 19a and 19b, a series of segmentous gaps may be provided, the intermediate areas between the individual segment gaps taking over the function of the spacers. Of course, other configurations of mold halves are also conceivable.

On the mold wall 17 in the area of the annular gap 16, there is a mask 21 which is impermeable to the energy form employed, here this is UV light, (or a mask which at least has poor permeability compared with the permeability of the mold), and this mask extends right to the mold cavity 15, and with the exception of the same, screens all the other parts, hollow spaces or areas of the mold 1 that are in contact with or may come into contact with the liquid, uncrosslinked, possibly excess material, from the radiated energy. Partial areas of the lens edge are therefore formed not by a limitation of the material by mold walls, but by a spatial limitation of the radiation or other forms of energy triggering polymerization or crosslinking.

In the case of UV light, the mask 21 may be preferably a chromium layer, that can be produced by processes known e.g. from photography or UV-lithography. The mask 21 does not necessary have to be fixed; it may also be, for example, removable or exchangeable.

In FIG. 1, radiation with UV light to crosslink the polymer takes place through the male casting mold 11. If the female mold half 12 does not have an absorbing antireflective coating 31 on the back side of the female mold half 12, reflections of the UV light can occur. The reflected UV light now crosslinks the lens material below the mask 21 of the male casting mold 11, whereupon a non-sharp contact lens edge or a flash attaching to contact lens edge is produced, since the material around the actual edge is crosslinked by reflected UV light. If, on the other hand, an absorbing antireflective coating 31 on the back side of the female mold half, these problems do not arise. Operating with the same principle, another option to solve the non-sharp contact lens edge or a flash attaching to contact lens edge is to apply an absorbing antireflective coating on a glass 32 which is attached on the flange 20A for the female mold half 12.

Figure 2:
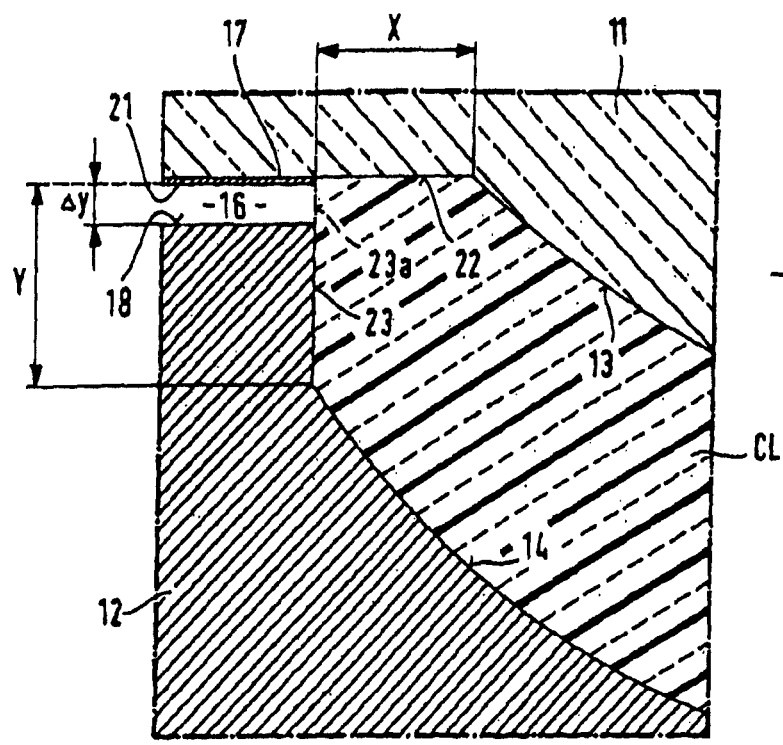
FIG. 2 is a detail, indicated by II in FIG. 1, on a greatly enlarged scale.

FIG. 2 shows the arrangement of the mold 1 in the transition region between the mold cavity 15 and the annular channel 16 as an enlarged detail. The cavity 15 has here, by way of example, a shape that corresponds to the typical rim geometry of a so-called soft contact lens CL. The cavity rim, and thus the lens rim, is formed here by two wall faces 22 and 23 which are arranged at right angles to one another and are arranged on the male and on the female mold halves 11 and 12 respectively. The width and the height of those two wall faces, and of the rim areas of the contact lens defined by them, are indicated by X and Y respectively. Obviously, the lens rim may in practice also be slightly rounded.

As can be seen clearly, the cylindrical wall face 23 of the female mold half 12 does not extend right up to the flat wall face 22 and the wall face 17, lying seamlessly adjacent thereto, of the male mold half 11, but is lower by the amount Δy, so that the annular gap 16 already mentioned, between the wall face 17 and the wall face 18 of the two mold halves 11 and 12, is formed or remains open.

The mask 21 provided on the wall face 17 of the male mold half 11 in this example embodiment extends horizontally exactly up to the extension 23a of the wall face. 23 of the female mold half 12. If the UV light, in the form of a parallel beam 3 causing the crosslinking, is incident at right angles to the wall face 22 and 17 and parallel to the cylindrical wall face 23, the space located at right angles below the mask 21 is in shadow and only the material located inside the cavity 15, that is inside the imaginary wall extension 23a, is crosslinked, resulting in a clean and burr-free lens rim which does not require any subsequent mechanical processing. If parallel energy radiation is used, therefore, disregarding the diffraction and scattering effects, which are usually negligible in practice, the contour of the mask 21 is transferred two-dimensionally parallel and (in this case) downwards into the rim area of the contact lens. Therefore, if the two mold halves 11 and 12 are separated from one another by the annular gap 16 of height Δy, the rim is formed towards the outside of the area resulting from that displacement by means of the spatial restriction of the energy radiation.

In general, the invention, in one respect, is directed a reusable mold for making a contact lens, comprising a first mold half having a first mold surface in contact with a silicone containing lens forming composition and a second mold half having a second mold surface in contact with the lens forming composition, wherein the first mold half and the second mold half are configured to receive each other such that a cavity is formed between the first mold surface and the second mold surface, wherein the cavity defines the shape of a contact lens to be molded, wherein the lens forming composition is polymerizable and/or crosslinkable by an actinic radiation, wherein at least one of the mold halves having an absorbing antireflective coating.

Lightstream Technology™ (Alcon) involving reusable molds and curing a lens-forming composition under a spatial limitation of actinic radiation. According to the Lightstream Technology™, the impingement upon the material of the energy causing crosslinking is restricted spatially to the region of the mold cavity, so that substantially only the starting material located in the mold cavity, that is to say the region of the contact lens, is crosslinked. Any excess starting material present is not polymerized or crosslinked. In that arrangement, partial areas of the contact lens edge are formed not by a mechanical limitation of the material by mold walls but by a spatial restriction of the impinging energy (usually UV or some other radiation) that triggers the polymerization or crosslinking. As a result of those two measures, contact between the two mold halves can in a preferred arrangement be avoided, so that they are not deformed and can accordingly be used again.

A reusable mold suitable for spatial limitation of radiation is used in the invention, the projected beam of radiation limits radiation (e.g., UV radiation) impinging on the pre-polymerization mixture of the lens-forming materials located in the path of the projected beam from the first molding surface to the second molding surface of the reusable mold. The resultant contact lens comprises an anterior surface defined by the first molding surface, an opposite posterior surface defined by the second molding surface, and a lens edge defined by the sectional profile of the projected radiation beam (i.e., a spatial limitation of radiation). According to the present application, any non-plastic reusable molds suitable for spatial limitation of radiation include without limitation those disclosed in U.S. Pat. Nos. 6,627,124, 6,800,225, 7,384,590, and 7,387,759, which are incorporated by reference in their entireties.

According to the present invention, applying energy on one side, it is in principle possible for the mold half facing away from the energy source to be produced from any material which withstands the crosslinkable material or components thereof. However, potential reflections and scattering of curing light are to be expected, depending on the type of energetic radiation (such as wavelength of curing light), and these may possibly lead to undesired effects such as producing flash on the edge because the reflections and scattering of curing light will polymerizing the lens forming material in the gap area between two molds.

The invention is partly based on the discovery that a hydrogel contact lens can be made using Lightstream Technology™ with mold system having at least one of the mold halves having an absorbing antireflective coating enable to achieve a hydrogel contact lens having a clean lens edge without flash. It is believed that reduction of reflection and scattering of curing light by using a mold system having at least one of the mold halves is made from at least one of the mold halves having an antireflective coating, wherein the absorbing antireflective coating having a less than 2 percent reflection in between 380 nm to 460 nm in near normal incident. Therefore, lens forming material left in the gap between base curve mold and front curve under a spatial limitation of actinic radiation will not be cured, and the un-crosslinked lens forming material left in the gap between base curve mold and front curve under a spatial limitation of actinic radiation can be washed away. As such, a hydrogel contact lens having a clean lens edge without flash can be produced. However, it is also surprisingly found out that a hydrogel contact lens having a clean lens edge without flash cannot be produced with any kind of antireflective coating on the non-plastic reusable mold. For example, a hydrogel contact lens having a clean lens edge without flash cannot be produced with broadband anti-reflection coating or narrowband antireflective coating on the non-plastic reusable mold. It is believed that a hydrogel contact lens is cured with UV radiation which is not near normal light incident, as a result the performance of the anti-reflection coating deteriorates, in order words more residual reflectance than the design (near normal incident). The residual reflectance for the absorptive anti-reflection coating is less angle dependent, and thus it is a robust solution covering wide range of wavelength.

According to the present invention, any absorbing antireflective coating can be used to coat the non-plastic reusable mold material to form contact lens has a clean lens edge without flash. It is known that an antireflective or anti-reflection (AR) coating is a type of optical coating applied to the surface of lenses and other optical elements to reduce reflection. Many coatings consist of transparent thin film structures with alternating layers of contrasting refractive index. Layer thicknesses are chosen to produce destructive interference in the beams reflected from the interfaces, and constructive interference in the corresponding transmitted beams. This makes the structure's performance change with wavelength and incident angle, so that color effects often appear oblique angles. A wavelength range must be specified when designing or ordering such coatings, but good performance can often be achieved for a relatively wide range of frequencies: usually a choice of IR, visible, or UV is offered.

The simplest interference anti-reflection coating consists of a single quarter-wave layer of transparent material whose refractive index is the square root of the substrate's refractive index; this, theoretically, gives zero reflectance at the center wavelength and decreased reflectance for wavelengths in a broad band around the center.

Several types of anti-reflection coating have been evaluated in the present application, for example: broadband anti-reflection coating, narrowband anti-reflection coating and absorbing antireflective Coating. Theoretically, any kind of anti-reflection coatings on the reusable mold can solve the problem the present application, i.e. reduce flash along lens edge due to lens forming material left in gap between base curve mold and front curve during curing under a spatial limitation of actinic radiation. However, it is unexpected that both broadband anti-reflection coating and narrowband anti-reflection coating on the reusable mold cannot completely eliminate flash along lens edge. Only absorbing anti-reflection coating on the reusable mold forms contact lens having a clean lens edge without flash.

Broadband anti-reflection coating refers to a type of anti-reflection coating which covers a large wavelength range in the order of hundreds of nm e.g. the visible range (400-700 nm) with maximum reflectivities of less than 0.5%. For example, broadband anti-reflection coating is commercially available from Evaporated Coating Inc. ECI #2005 coating. Narrowband anti-reflection coating refers to a type of anti-reflection coating which only covers a small wavelength range typically under 100 nm. For example, narrowband anti-reflection coating is commercially available from Evaporated Coating Inc. ECI #289 coating on glass substrate and ECI #149 for coating on plastic substrate. In contrast, absorbing antireflective Coating refers to a type of anti-reflection coating which contains light absorption layers. For example, broadband anti-reflection coating is commercially available from Evaporated Coating Inc. ECI #289EX coating on glass substrate and ECI #149EX for coating on plastic substrate. Absorbing antireflective Coating is useful in situations where high transmission through a surface is unimportant or undesirable, but low reflectivity is required. Absorbing antireflective Coatings often make use of unusual optical properties exhibited in compound thin films produced by sputter deposition.

It is believed that a hydrogel contact lens is cured with UV radiation which is not near normal light incident, as a result the performance of the anti-reflection coating deteriorates, in order words more residual reflectance than the design (near normal incident). The residual reflectance for the absorptive anti-reflection coating is less angle dependent than narrowband anti-reflection coating and broadband anti-reflection coating, and thus it is a robust solution covering wide range of wavelength.

According to the present invention, any kind of absorptive anti-reflection coating can be used. For example, absorbing anti-reflection coatings often make use of unusual optical properties exhibited in compound thin films produced by sputter deposition. For example, titanium nitride and niobium nitride are used in absorbing anti-reflection coatings. The present application preferably uses layers of nitrides of certain transition metals to provide a light attenuating, anti-reflection coating. The transition metals known to form nitrides, and useful in the present invention, include titanium, zircomium. These transition metal nitrides may have optical properties similar to metals. A preferred method of depositing these films is by DC reactive sputtering of the metal in an atmosphere including nitrogen or ammonia. Films may also be deposited by chemical vapor deposition. The structure of the present application includes layers which substantially comprise transition metal nitrides, i.e., for the most part are transition metal nitrides. The most common of the transition metal nitrides is titanium nitride.

According to the present application, the absorbing antireflective coating comprises at least two layers of coating. Preferably, the absorbing antireflective coating comprises at least three layers of coating and among the three layers of coating comprises at least two layers of a transition metal nitride. The transition metal nitride layers comprise a material selected from the group consisting of titanium nitride, zirconium nitride, hafnium nitride, vanadium nitride, niobium nitride, tantalum nitride and chromium nitride. Preferably, the absorbing antireflective coating has a less than 2 percent reflection between 380 nm to 460 nm in near normal incident (i.e. angle of incident is 0 to 20°. The composition and structure and the absorbing antireflective coating described in U.S. Pat. No. 5,091,244, which is hereby incorporated by reference in its entirety. According to the present invention, a hydrogel lens-forming material refers to any material which can be polymerized and/or crosslinked by actinic radiation to form a contact lens. A preferred group of lens-forming materials are prepolymers which are water-soluble and/or meltable. It would be advantageous that a lens-forming material comprises primarily one or more prepolymers which are preferably in a substantially pure form (e.g., purified by ultrafiltration). For example, prefunctionalised PVA (polyvinyl alcohol) polymer used as lens forming material, as illustrated in U.S. Pat. Nos. 5,508,317; 8,030,369 and U.S. patent application publication no. 2006/0251696, which are incorporated by reference in their entireties. A more preferred group of lens-forming materials is silicone-containing hydrogel. Generally silicone-containing hydrogel comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent, a free-radical initiator (photoinitiator or thermal initiator), a hydrophilic vinylic macromer/prepolymer, and combinations thereof, as well known to a person skilled in the art, as illustrated in U.S. Pat. Nos. 5,760,100 and 8,480,227, which are incorporated by reference in their entireties. A still more preferred group of lens-forming materials is UV-absorbing silicone-containing hydrogel. Generally UV-absorbing silicone-containing hydrogel lens forming mixture comprises at least one hydrophilic vinylic monomer, at least one siloxane-containing vinylic monomer, at least one polysiloxane crosslinker (with two or more ethylenically-unsaturated groups), at least one UV-absorbing vinylic monomer that absorbs ultraviolet light and optionally (but preferably) high-energy violet light from 381 nm to 440 nm, at least one tinting agent, and at least one germanium-based Norrish Type I photoinitiator capable of initiating a free-radical polymerization under irradiation with a light source including a light in the region of about 380 to about 550 nm, and the UV-absorbing silicone-containing hydrogel lens forming mixture is irradiated in the mold with a light in a region of from 380 to 550 nm and crosslinking the lens-forming materials to form the UV-absorbing silicone hydrogel contact lens, as illustrated in case, U.S. Patent Application No. 61/884,181, which is incorporated by reference in their entireties. Any suitable UV-absorbing vinylic monomers can be used in the preparation of a UV-absorbing polymer of the invention. A UV-absorbing vinylic monomer used in the invention comprises a benzophenone-moiety, preferably a benzotriazole-moiety. In a preferred embodiment, a UV-absorbing vinylic monomer used in the invention is a benzotriazole-containing UV/HEVL absorber that absorbs both ultraviolet light and high-energy violet light (HEVL), for example, 2-(2'-hydroxy-5'-methacryloxyethyl phenyl) benzotriazole (2-Propenoic acid, 2-methyl-, 2-[3-(2H-benzotriazol-2-yl)-4-hydroxyphenyl]ethyl ester, Norbloc). Any germanium-based Norrish Type I photoinitiators can be used in the UV-absorbing silicone-containing hydrogel lens forming mixture, so long as they are capable of initiating a free-radical polymerization under irradiation with a light source including a light in the region of about 380 to about 550 nm. Examples of germanium-based Norrish Type I photoinitiators are acylgermanium compounds described in U.S. Pat. No. 7,605,190 (herein incorporated by reference in its entirety). For curing the UV-absorbing silicone-containing hydrogel lens forming mixture, light source can be any ones emitting light in the 380-550 nm range sufficient to activate germanium-based Norrish Type I photoinitiators. Blue-light sources are commercially available and include: the Palatray CU blue-light unit (available from Heraeus Kulzer, Inc., Irvine, Calif.), the Fusion F450 blue light system (available from TEAMCO, Richardson, Tex.), Dymax Blue Wave 200, LED light sources from Opsytec (385 nm, 395 nm, 405 nm, 435 nm, 445 nm, 460 nm), LED light sources from Hamamatsu (385 nm), and the GE 24" blue fluorescent lamp (available from General Electric Company, U.S.). A preferred blue-light source is the UV LED from Opsytec (those described above). The intensity of the light source is set to produce lenses of good quality given the light source and photoinitiator. The total intensity of the light source is preferably from about 10 to about 100 mW/cm2, preferably from about 20 to about 60 mW/cm2 between the 380 nm to 550 nm region is more preferred. The crosslinking may be effected in any time period of about 40 minutes or less, preferably in a very short time (e.g. in ≤ about 120 seconds, preferably in ≤about 80 seconds, more preferably in ≤50 about seconds, even more preferably in about 30 seconds, and most preferably in 5 to 30 seconds).

The invention, in another respect, relates to a method for producing a contact lens, comprising the steps of:
(1) providing a contact lens mold, wherein the mold comprising a first mold half having a first mold and a second mold half having a second mold surface, wherein the first mold half and the second mold half are configured to receive each other such that a cavity is formed between the first mold surface and the second mold surface, wherein the cavity defines the shape of a contact lens to be molded, wherein at least one of the mold halves wherein at least one of the mold halves having an absorbing antireflective coating, wherein the mold is a non-plastic mold,
(2) introducing a lens-forming composition into the cavity formed by the first and second molding surfaces, material, wherein the lens-forming material is crosslinkable and/or polymerizable by actinic radiation;
(3) crosslinking/polymerizing the lens-forming material in the mold to form a lens having a polymer matrix;
(4) opening the mold and removing the formed contact lens from the mold, wherein the formed contact lens has a clean lens edge without flash.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Preparation of CE-PDMS Macromer

In the first step, α,ω-bis(2-hydroxyethoxypropyl)-polydimethylsiloxane (Mn=2000, Shin-Etsu, KF-6001a) is capped with isophorone diisocyanate (IPDI) by reacting 49.85 g of α,ω-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at about 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM (i.e., CE-PDMS terminated with methacrylate groups).

Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum (2×10-2 mBar). Then, under an atmosphere of dry nitrogen, 320 g of distilled MEK is then added into the reactor and the mixture is stirred thoroughly. 0.235 g of DBTDL is added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. About 0.235 g of DBTDL is added, and the reactor is held at about 55° C. overnight under a blanket of dry nitrogen. The next day, MEK is removed by flash distillation. The reactor is cooled and 22.7 g of IEM are then charged to the reactor followed by about 0.235 g of DBTDL. After about 3 hours, an additional 3.3 g of IEM are added and the reaction is allowed to proceed overnight. The following day, the reaction mixture is cooled to about 18° C. to obtain CE-PDMS macromer with terminal methacrylate groups.

Example 2

Preparation of Formulations for Lens Fabrication (a Pre-Polymerization Mixture of Lens Forming Materials)

Lens formulations are prepared by mixing components listed in Table 2 below followed by heating at 40° C. for 20 min.

TABLE 2

| Lens Formulation | 2 |
| --- | --- |
| Carbazole violet | — |
| CuP tint (%) | 0.1 |
| DMPC (%) | 0.76 |
| LPEG2000 (%) | 0.61 |
| Norbloc (%) | 1 |
| CE PDMS (%) | |
| Tris acrylamide (%) | 19.71 |
| Darocur 1173 (%) | — |
| Ge-PI (%) | 0.36 |
| 1-propanol (%) | 23.82 |
| DMA (%) | 23.24 |

L-PEG 2000: N-(carbonyl-methoxypolyethylene glycol-2000)-1,2-disteaoyl-sn-glycero-3-phosphoethanolamin, sodium salt;
CE-PDMS: chain-extended polydimethylsiloxane crosslinker prepared in Example 2;
DMA: N,N-dimethylacrylamide;
TRIS-Am: N-[tris(trimethylsiloxy)-silylpropyl]acrylamide;
WL-1: 2-hydroxy-5-methoxy-3-(5-(trifluoromethyl)-2H-benzo[d][1,2,3]triazol-2-yl)benzyl methacrylate;
Darocur 1173: 2-Hydroxy-2-methylpropiophenone
DMPC: 1,2-Dimyristoyl-sn-glycero-3-phophocholine
Carbazole violet: pigment added to adjust final lens color
CuP tint: 5% copper phthalocyanine blue pigment dispersion in TRIS acrylamide tris (trimethylsiloxy)silylpropylmethacrylate, Example 3

PAA-coating solution. A polyacrylic acid (PAA) coating solution is prepared by dissolving an amount of PAA (M.W.:

450 kDa, from Lubrizol) in a given volume of 1-propanol (1-PrOH) to have a concentration of about 0.44% by weight and the pH is adjusted with formic acid to about 2.0. Preparation of In-Package-Coating solution (IPC saline). Poly(AAm-co-AA)(90/10) partial sodium salt (~90% solid content, poly(AAm-co-AA) 90/10, Mw 200,000) is purchased from Polysciences, Inc. and used as received. Polyamidonamine epichlorohydrin (PAE) (Kymene, an azetidinium content of 0.46 assayed with NMR) is purchased from Ashland as an aqueous solution and used as received. IPC saline is prepared by dissolving about 0.07% w/w of poly(AAm-co-AA)(90/10) and about 0.15% of PAE (an initial azetidinium millimolar equivalents of about 8.8 millimole) in phosphate-buffered saline (PBS) (about 0.044 w/w % $NaH_2PO_4.H_2O$, about 0.388 w/w/ % $Na_2HPO_4.2H_2O$, about 0.79 w/w % NaCl) and adjusting the pH to 7.2~7.4. Then the IPC saline is heat pre-treated for about 4 hours at about 70° C. (heat pretreatment). During this heat pretreatment, poly(AAm-co-AA) and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC is cooled to room temperature then filtered using a 0.22 micron PES membrane filter.

Example 4

Lens Fabrication Using Formulation 2.

Lenses are prepared by cast-molding from the lens formulation prepared above in two set of reusable mold. The first set for lens sample 2A uses quartz base curve mold half and glass front curve mold half and the second set for lens sample 2B uses quartz base curve mold half and LBHH-1 front curve mold half. Lens formulation 2 prepared in Example 2 are used for both lens samples 2A and 2B. Lens formulation 2 in molds is irradiated for 25 seconds using a 405 nm LED supplied by Opsytec for both lens samples 2A and 2B. The measured total intensity from 350 to 460 nm is about 25 mW/cm2. Cast-molded contact lenses are then extracted by dipping in the following series of baths: deionized (DI) water bath (about 56 seconds); 3 methyl ethyl ketone (MEK) baths (about 22, 78, 224 seconds respectively, (DI) water bath (about 56 seconds). After lens extraction, the lenses are in contact for 44 seconds with the PAA-coating solution prepared above to form a PAA coating on each lens, then equilibrated into water, and then placed into polypropylene shells containing 0.65 mL of IPC saline prepared above, and autoclaved for 45 minutes at 121° C.

The lens edge quality and curing conditions are given in Table 3 below.

What we claim is:

1. A reusable non-plastic mold for making a contact lens, comprising a first mold half having a first mold surface in contact with a hydrogel contact lens forming composition and a second mold half having a second mold surface in contact with the lens forming composition, wherein the first mold half and the second mold half are configured to receive each other such that a cavity is formed between the first mold surface and the second mold surface, wherein the cavity defines the shape of a contact lens to be molded, wherein the lens forming composition is polymerizable and/or crosslinkable by UV, wherein the first mold half facing the source of UV includes a peripheral region which defines the edge of the contact lens, wherein the peripheral region has a mask to block UV, wherein the back side, non-optical surface of the second mold half has an absorbing antireflective coating.

2. The reusable mold for making a contact lens of claim 1, wherein the absorbing antireflective coating having a less than 2 percent reflection between 380 nm to 460 nm in near normal incident.

3. The reusable mold for making a contact lens of claim 1, wherein the absorbing antireflective coating comprising at least two layers of coating.

4. The reusable mold for making a contact lens of claim 3, wherein the absorbing antireflective coating comprising at least three layers of coating.

5. The reusable mold for making a contact lens of claim 4, wherein the absorbing antireflective coating comprising at least two layers of a transition metal nitride.

6. The reusable mold for making a contact lens of claim 5, wherein the transition metal nitride layers comprise a material selected from the group consisting of titanium nitride, zirconium nitride, hafnium nitride, vanadium nitride, niobium nitride, tantalum nitride and chromium nitride.

7. A method for producing a contact lens, comprising the steps of:
(1) providing a non-plastic contact lens mold, wherein the mold comprising a first mold half having a first mold and a second mold half having a second mold surface, wherein the first mold half and the second mold half are configured to receive each other such that a cavity is formed between the first mold surface and the second mold surface, wherein the cavity defines the shape of a contact lens to be molded, wherein the first mold half facing the source of UV includes a peripheral region which defines the edge of the contact lens, wherein the peripheral region has a mask to block UV, wherein the back side, non-optical surface of the second mold half has an absorbing antireflective coating

TABLE 3

| | 2A | 2B | 2c | 2d |
|---|---|---|---|---|
| Cure Lamp | 405 nm LED | 405 nm LED | 405 nm LED | 405 nm LED |
| Total Intensity (mW/cm2) | 25 | 25 | 25 | 25 |
| Cure Time (s) | 25 | 25 | 25 | 25 |
| Base Curve/Front Curve Mold | quartz /N-B270 glass | quartz/N-B270 glass | quartz/N-B270 glass | quartz/N-B270 glass |
| Anti-reflective coating (ARC) | No ARC | Narrowband ARC on N-B270 back side | Broadband ARC on N-B270 back side | Absorbing ARC on N-B270 back side |
| Lens Edge Quality | Heavy flash, bad lens edge quality | Small flash | Tiny flash | No flash, great lens edge quality |

(2) introducing a lens-forming composition into the cavity formed by the first and second molding surfaces, material, wherein the lens-forming material is crosslinkable and/or polymerizable by actinic radiation;
(3) crosslinking/polymerizing the lens-forming material in the mold to form a lens having a polymer matrix;
(4) opening the mold and removing the formed contact lens from the mold, wherein the formed contact lens has a clean lens edge without flash.

8. The method for producing a contact lens of claim 7, wherein the absorbing antireflective coating having a less than 2 percent reflection between 380 nm to 460 nm in near normal incident.

9. The method for producing a contact lens of claim 7, wherein the absorbing antireflective coating comprising at least two layers of coating.

10. The method for producing a contact lens of claim 8, wherein the absorbing antireflective coating comprising at least three layers of coating.

11. The method for producing a contact lens of claim 9, wherein the absorbing antireflective coating comprising at least two layers of a transition metal nitride.

12. The method for producing a contact lens of claim 11, wherein the transition metal nitride layers comprise a material selected from the group consisting of titanium nitride, zirconium nitride, hafnium nitride, vanadium nitride, niobium nitride, tantalum nitride and chromium nitride.

* * * * *